UNITED STATES PATENT OFFICE.

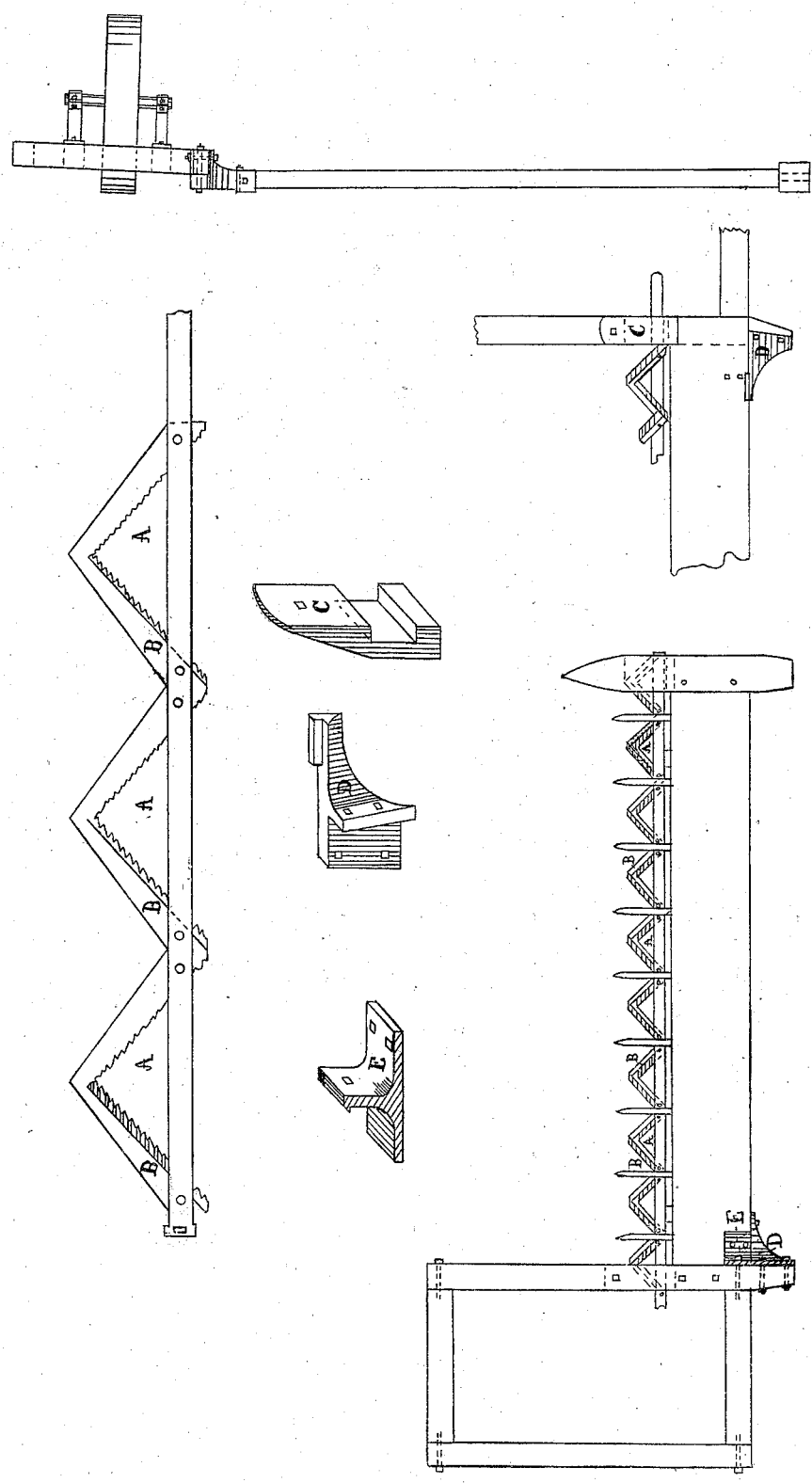

BRONSON MURRAY, OF FARM RIDGE, ASSIGNOR TO T. R. SPENCER, ASSIGNOR TO J. S. WRIGHT, OF CHICAGO ILLINOIS.

IMPROVEMENT IN HARVESTER-CUTTERS.

Specification forming part of Letters Patent No. 11,076, dated June 13, 1854.

*To all whom it may concern:*

Be it known that I, BRONSON MURRAY, of the county of La Salle, town of Farm Ridge, State of Illinois, have invented a new and improved method for removing the clogging matter which obstructs the free motion of the sickle or knife blades in machinery for cutting grass and grain, and also for supporting and bracing and strengthening and arranging the arm or bar, commonly called the "sickle-board," in such machines, of which the following is a specification.

The nature of my invention consists in furnishing the sickle or knife blade with two cutting-edges—one to cut the grain or grass in front, the other to cut in the rear, and remove from the fingers or separators which support the said blade the fibrous, glutinous, or other solid matter which may gather upon said fingers or separators, whether above or below the blade aforesaid, in the operation of cutting grass and some grains. I support, by means of knees and shoulders of cast-iron or other material, the sickle-board aforesaid in such manner that said sickle-board may come in close contact with the earth while running, and without the intervention of any pieces of iron between said sickle-board and the earth. I place the said sickle-board at an angle with the frame-work of the machine, so that while the machine runs on an inclination the sickle-board shall run horizontally, or as nearly so as shall be considered desirable.

To enable others skilled in the art to make and use my invention, I proceed to describe its construction and operation.

I construct from a plate of steel or other suitable metal the blade B of my sickle or knife, with such arrangement for the cutting of the grass or grain as may be preferred. Behind the cutting-edge, and at suitable places, I cut away openings, as shown at A A A in the accompanying diagram, which openings I generally make of an angular form and extend entirely back, so as to cut away the back part of the blade. One or both of the edges of the openings thus created I furnish with sharp serrations. This I generally do by filing down such edge or edges to a bevel, and with a chisel cut serrations or points in the said bevel. These serrations, in the vibration of the sickle, catch and remove said clogging matter. My usual mode is to cause one set of edges—as, for instance, all those to the right of all the various letters A A—to remove the matter from the lower side of the fingers or separators aforesaid, and another set to remove it from the upper side of the same, which I do by beveling the first-named edge from or on the upper side of the knife or sickle blade and the other edge (last named) from or on the lower side, and vice versa.

I construct the knees and shoulders referred to of cast-iron or other suitable material, and bolt them to the frame-work of the machine securely, C. One of the knees or shoulders is directly in front of the sickle-board, at the end which runs inside the said frame-work, while another, D, bolted to the side and bottom of the said frame-work, projects outward and along the back of said sickle-board, thereby strengthening and supporting the same from fracture by reason of the sickle-board striking stones or other obstructions during the operation of cutting. Another and third knee is that (marked E in the accompanying diagram) which is bolted to the side of the said frame-work directly over the joining with the said sickle-board, and is also bolted in one or more places to the said sickle-board, and keeping it parallel with the top of the frame-work. These knees and shoulders may be made in one, two, or three pieces, the advantage in their use being that they are so placed as not to obstruct the passage of the cut grass and grain from the machine, nor raise the sickle-board up in the least from the ground, thereby enabling the grass to be cut closer, nor to prevent the grass from being cut in the very angle formed by the junction of the sickle-board with the frame-work, as is the case with every bracing having its support on the frame-work in front or in advance of said sickle-board or underneath the same.

It is obvious that the part of the sickle cut out may be of any shape, although I prefer an angular, as represented in the drawings; or a mere opening may be cut in the blade, leaving a portion of the blade at the back, and then making the serrations or points in the edges of the openings of the blades.

I do not claim having invented any particular form for the irregular or angular-shaped back, or any particular form for the front cutting-edge of the sickle.

What I claim, and desire to secure by Letters Patent, is—

Making the rear serratures of the sickle-blade sickle-edged, as set forth, except the rear projecting points back of the knife-bar, which latter construction I disclaim.

BRONSON MURRAY.

Witnesses:
A. C. FISHER,
P. SINALEY.